UNITED STATES PATENT OFFICE.

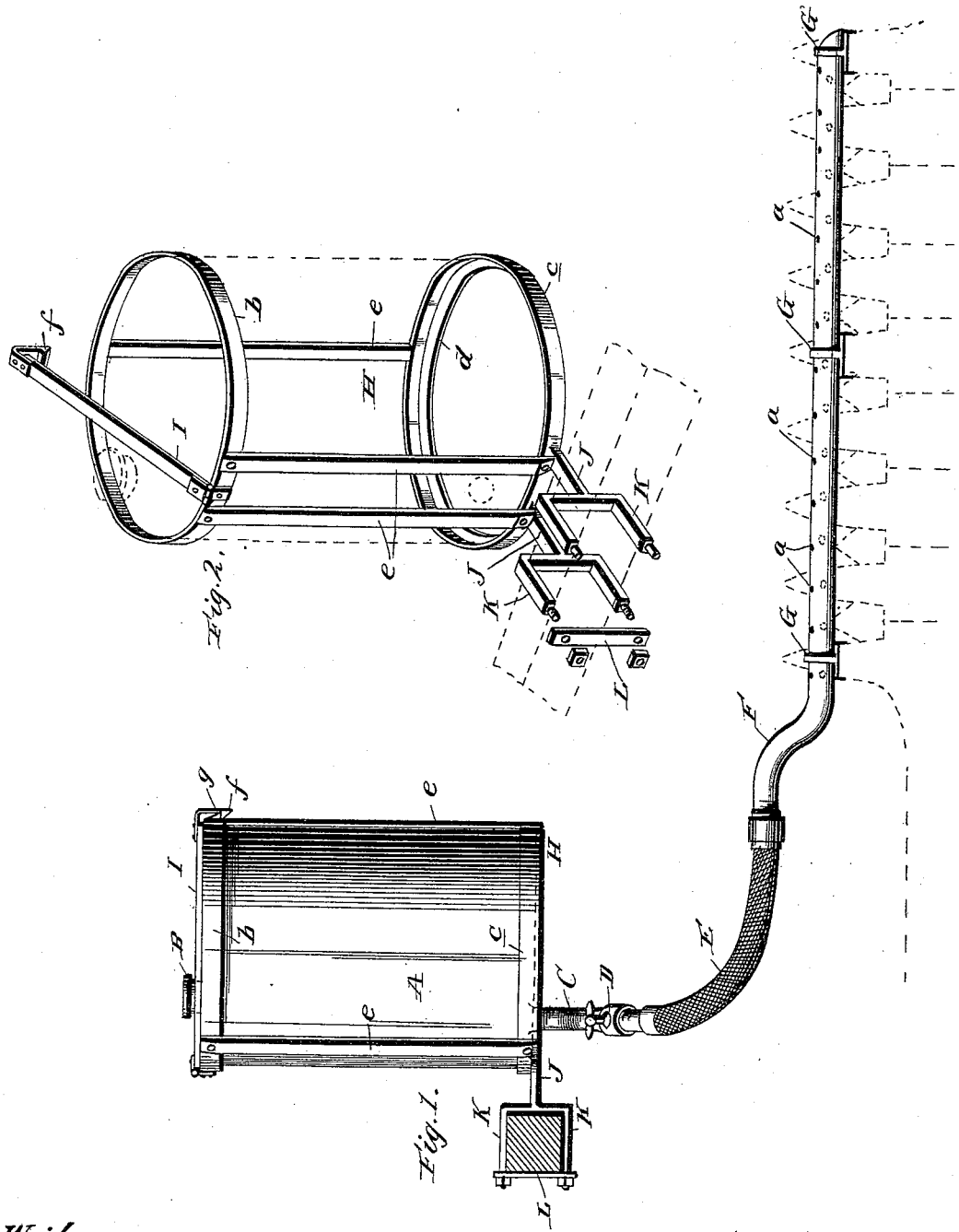

FRANK HAMPTON AND GEORGE L. HANER, OF JOHN DAY, OREGON; SAID HANER ASSIGNOR OF ONE-HALF HIS RIGHT TO MARY C. CURL, OF SAME PLACE.

CUTTING APPARATUS.

SPECIFICATION forming part of Letters Patent No. 464,603, dated December 8, 1891.

Application filed October 25, 1890. Serial No. 369,380. (No model.)

*To all whom it may concern:*

Be it known that we, FRANK HAMPTON and GEORGE L. HANER, citizens of the United States, residing at John Day, in the county of Grant and State of Oregon, have invented certain new and useful Improvements in Attachments for Reapers and Mowers; and we do declare the following to be a full, clear, and exact description of the invention, such as will enable others skilled in the art to which it appertains to make and use the same.

Our invention relates to improvements in attachments for mowing-machines and the like; and it has for its object to provide a means for keeping the cutting apparatus of such machines constantly moist, whereby the said apparatus is lubricated, the draft and friction materially reduced, and the objectionable gumming and clogging of the cutting-teeth are obviated. These objects we accomplish through the medium of the devices hereinafter described, and illustrated in the accompanying drawings, in which—

Figure 1 represents our improved tank in elevation attached to a section of the draft-pole of a mower, and the spray-pipe in plan attached to a cutting apparatus, the latter being shown in dotted lines; and Fig. 2 is a perspective view of the tank-supporting frame, together with the devices employed to fasten said frame upon the pole or tongue of the machine, the pole being illustrated in dotted lines.

Referring by letter to said drawings, A indicates the tank or reservoir, which may be of a cylindrical or other desirable form and of a size suitable to its purpose. This tank A is provided in its top with an opening for the introduction of water, and this opening or aperture, which is preferably surrounded by a screw-threaded boss, is designed to be closed by an interiorly-threaded cap, as B.

Leading from the bottom of the reservoir or tank A is a pipe, as C, which is of a suitable diameter and is so shaped as to best suit the machine upon which our improvements are employed. This pipe C is provided at a suitable point in its length with a cut-off valve or regulating-cock, as D.

Suitably coupled to the end of the pipe C is a flexible pipe or hose E, which may be formed in any desirable manner, and is coupled at its opposite end to the end of the distributing or spray pipe F, which is suitably curved at its inner end to avoid interference with the movements of the sickle-bar. This distributing pipe or tube F, which is preferably of a proportional diameter, as illustrated, extends the full length of the finger-bar and has its outer end closed, as shown, to prevent the escape of water therefrom. At suitable intervals in the length of the distributing-pipe F we provide small openings, as $a$, through which the water is sprayed upon the sickle-knives for the purpose described. The under side of the distributing-pipe is preferably flattened where it rests upon the finger-bar, and the said pipe is secured to the bar by means of suitable straps or bands G, arranged at suitable intervals.

The supporting-frame H of the tank or reservoir A is of a size and form corresponding to the size and form of the tank, and the said frame comprises an upper hoop or band $b$ and a lower hoop $c$, which latter hoop is provided with an inwardly-directed annular flange $d$, upon which the bottom of the tank rests when placed in the frame. These upper and lower hoops $b$ and $c$ are connected by means of upright bars $e$, which are of a suitable length and are suitably fastened to the peripheries of the hoops.

Suitably hinged to the periphery of the upper hoop $b$ is a bar I, which is provided at its opposite end with a suitable spring-catch $f$, which engages a beveled lug $g$, fixed on the periphery of said hoop at a diametrically-opposite point to its hinge-point, and by the employment of this top bar I it will be seen that the tank A is firmly held in the frame and all jolting is obviated.

The supporting-frame is mounted upon the pole of the machine by means of bracket-arms J, which are connected with or formed integral with the lower hoop $c$ and extend parallel from the same. Formed integral with these arms J are rectangular bails or yokes K, which take below and above the tongue of the machine, and at the ends of the horizontal branches of the bails we provide a reduced and threaded portion to receive fastening-nuts, which serve to fasten straps L upon the branches to fasten the same upon the tongue.

From the foregoing description it will be seen that we have provided a cheap and simple lubricator for the cutting apparatus of a mowing-machine or the like, which may be operated and attended by unskilled labor.

Having described our invention, what we claim, and desire to secure by Letters Patent, is—

1. A tank-supporting frame comprising an upper hoop, a bar hinged at one end to said hoop and adapted to be removably secured to said hoop at a diametrically-opposite point, a lower hoop having an inwardly-directed annular flange at its lower edge, and bars connecting said hoops, substantially as described.

2. A tank-supporting frame comprising an upper hoop, a lower hoop having an inwardly-directed annular flange at its lower edge, upright bars connecting said hoops, parallel brackets extending from the lower hoop, having rectangular bails or yokes at their outer ends adapted to take over a pole or tongue, and straps adapted to secure said bails in position upon the pole, all adapted to operate substantially as and for the purpose described.

FRANK HAMPTON.
GEO. L. HANER.

Witnesses:
THOMAS H. CURL,
J. W. MACK.